United States Patent
Rieger et al.

[11] Patent Number: 6,083,423
[45] Date of Patent: *Jul. 4, 2000

[54] NEMATIC LIQUID CRYSTAL MIXTURES AND A MATRIX LIQUID CRYSTAL DISPLAY

[75] Inventors: Bernhard Rieger, Yokohama, Japan; Volker Reiffenrath, Rossdorf; Reinhard Hittich, Modautal, both of Germany

[73] Assignee: Merck Patent Gesellschaft mit Beschrankter Haftung, Darmstadt, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/816,135

[22] Filed: Mar. 12, 1997

Related U.S. Application Data

[63] Continuation of application No. 08/462,525, Jun. 5, 1995, abandoned, which is a continuation of application No. 08/067,154, May 26, 1993.

[30] Foreign Application Priority Data

Apr. 2, 1990 [EP] European Pat. Off. ............. 90106252
Aug. 13, 1990 [EP] European Pat. Off. ............. 90115501

[51] Int. Cl.$^7$ ............................ C09K 19/30; C09K 19/12; G02F 1/13
[52] U.S. Cl. ............................. 252/299.63; 252/299.66; 349/186
[58] Field of Search ..................... 252/299.63, 299.66; 349/186

[56] References Cited

U.S. PATENT DOCUMENTS

| | | | |
|---|---|---|---|
| 4,849,130 | 7/1989 | Dabrowski et al. | 252/299.61 |
| 5,047,170 | 9/1991 | Huunh-ba et al. | 252/299.6 |
| 5,064,567 | 11/1991 | Funada et al. | |
| 5,122,295 | 6/1992 | Weber et al. | 252/299.01 |
| 5,286,411 | 2/1994 | Rieger et al. | 252/299.63 |
| 5,302,313 | 4/1994 | Goto et al. | 252/299.63 |
| 5,308,538 | 5/1994 | Weber et al. | 252/299.63 |
| 5,308,541 | 5/1994 | Hittich et al. | 252/299.63 |
| 5,308,542 | 5/1994 | Poetsch et al. | 252/299.63 |
| 5,368,772 | 11/1994 | Rieger et al. | 252/299.63 |
| 5,387,395 | 2/1995 | Weber et al. | 252/299.63 |

FOREIGN PATENT DOCUMENTS 0 272 580 12/1987 European Pat. Off. .
256636 2/1988 European Pat. Off. .

OTHER PUBLICATIONS

R. Dabrowski et al., *Liquid Crystals*, vol. 5, No. 1, pp. 209–216, 1989.
V. Reiffenrath et al., *SPIE*, vol. 1257 Liquid Crystal Displays and Applications (1990) pp. 84–94.

*Primary Examiner*—C. H. Kelly
*Attorney, Agent, or Firm*—Millen, White, Zelano, & Branigan, P.C.

[57] ABSTRACT

The invention relates to a nematic liquid crystal mixture having a positive dielectric anisotropy Δε of at least +4 and a birefringence Δn of at least 0.12, characterized in that the mixtures comprises one or more components having the core structure

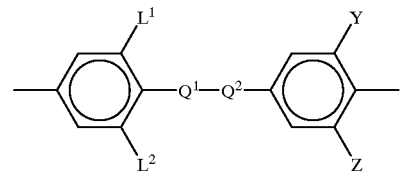

wherein $L^1$, $L^2$, Y and Z are each independently of one another H or F, one of $Q^1$ and $Q^2$ is 1,4-phenylene, 3-fluoro-1,4-phenylene or 3,5-difluoro-1,4-phenylene and the other residue $Q^1$ or $Q^2$ is —$CH_2CH_2$—, —$CH_2CH_2CH_2CH_2$— or — if at least one of $L^1$, $L^2$, Y and Z denotes F— also a single bond, whereby this core structure can be optionally further fluorinated in the benzene rings.

21 Claims, No Drawings

NEMATIC LIQUID CRYSTAL MIXTURES AND A MATRIX LIQUID CRYSTAL DISPLAY

This application is a continuation, of application Ser. No. 08/462,525, filed Jun. 5, 1995 now abandoned, which is a continuation of Ser. No. 08/067,154, filed May 26, 1993 pending.

SUMMARY OF THE INVENTION

The invention relates to an active matrix liquid crystal display (AMD) being operated in the second or a higher transmission minimum of the Gooch-Tarry curve and to stable nematic liquid-crystal compositions with high optical anisotropy for use in such AMDs, e.g. for projection systems.

Active matrix displays (AMD) are highly favored for commercially interesting displays with a high information content. Such AMDs are used for TV application and also for displays for, e.g. laptops, automobiles and airplanes.

AMDs have non-linear electrical switching elements which are integrated at each picture element. As non-linear driving elements thin film transistors (TFT) [Okubo, U., et al., 1982, SID 82 Digest, pp. 40–41] or diodes (e.g.: metal insulator metal: MIM) [Niwa, K., et al., 1984, SID 84 Digest, pp. 304–307] can be applied. These non-linear driving elements allow to use an electro-optical effect with a rather flat electro-optical characteristic if a good viewing angle characteristic can be obtained. So a TN-type LC cell [Schadt, M. and Helfrich, W., 1971, Appl. Phys. Lett., 18, 127] with a twist angle in the region of 90° can be used. To provide the good contrast over a wide viewing angle, operation in the region of the first minimum of transmission [Pohl, L., Eidenschink, R., Pino, F., del. and Weber, G., 1980, German Pat., DBP 30 22 818, and 1981, U.S. Pat. No. 4,398,803; Pohl, L., Weber, G., Eidenschink, R., Baur, G., and Fehrenbach W., 1981, Appl. Phys. Lett., 38, 497; Weber, G., Finkenzeller, U., Geelhaar, T., Plach, H. J., Rieger, B., and Pohl, L., 1988, Int. Symp. on Liq. Cryst., Freiburg, to be published in Liq. Crys.] is favored. These AMDs are very well suited for direct view and projection type TV-displays and consequently are of high commercial interest. For these applications some physical properties of the liquid crystals become more important than for passive TN displays. Some of the decisive properties for the performance of an AMD are resistivity and UV- and thermal stability of the liquid crystal [Togashi, S., Sekiguchi, K., Tanabe, H., Yamamoto, E., Sorimachi, K. Tajima, E., Watanabe, H., Shimuzu, H., Proc. Eurodisplay 84, September 1984: A 210–288 Matrix LCD Controlled by Double Stage Diode Rings, p. 141 ff, Paris; Stromer, M., Proc. Eurodisplay 84, September 1984: Design of Thin Film Transistors for Matrix Addressing of Television Liquid Crystal Displays, p. 145 ff, Paris]. A problem often encountered is the adverse influence of UV-illumination on the resistivity and therefore on the general performance of the liquid crystal mixture in the display.

In an AMD the non-linear switching elements are addressed in a multiplex scheme. So they charge the electrodes of a pixel in the limited time they are active. Then they become inactive until they are addressed again in the next cycle. Consequently the change of the voltage on an activated (charged) pixel is a nondesired but a very decisive feature of such a display. The discharge of a pixel is determined by two factors. These are the capacity of the pixel element including liquid crystal and the resistivity of the dielectric material between the electrodes, namely the liquid crystal. The characteristic time constant of the decay of the voltage at a pixel (RC-time) has to be significantly bigger than the time between two addressing cycles ($t_{adr.}$). A parameter frequently used to describe the performance of an AMD is the voltage holding ratio HR of a picture element:

$$HR = \frac{V(to) + V(to + tadr.)}{2V(to)}$$

As the voltage at a pixel decays exponentially an increase of the holding ratio necessitates liquid crystal materials with exceptionally high resistivities.

There are several points of importance for the resistivity of the liquid crystal inside a display, e.g., orientation layers, curing condition of the orientation material. But by no means less important are the electrical properties of the liquid crystal used. Especially the resistivity of the liquid crystal in the display determines the magnitude of the voltage drop at the pixel.

Earlier investigations with low-$\Delta$n materials have shown, that the requirements with regard to resistivity and UV-stability and temperature dependence of the resistivity for TFT-applications cannot be met with materials containing cyano moieties as terminal groups. Non-cyano materials containing halogenated terminal groups can show far better resistivity values and UV-stability as well as superior viscosity values than conventionally used cyano materials. However, in general these non-cyano materials unfortunately show a strong tendency towards forming smectic phases, especially at low temperatures. Also, the clearing points and the dielectric anisotropy values of non-cyano materials with halogenated terminal groups are much lower.

Modern commercial mixtures have to operate over a wide temperature range; therefore, crystallization or formation of smectic phases at low temperatures has to be excluded. Good solubility is one of the most important preconditions for the usability of liquid crystalline materials in the development of nematic mixtures. Compounds with high melting temperatures or a tendency to form smectic phases are for this reason not suitable.

By very careful selection of the components and an appropriate mixture design it was possible to find low birefringence non-cyano mixtures having a broad nematic temperature range for first mininmum application [B. Rieger et al., Proc. 18. Freiburger Arbeitstagung Flüssigkristalle, Freiburg 1989, 16 (1989)]. Non-cyano materials with high birefringence, which are essential for the mixture concept of this invention unfortunately show in many cases even more unfavorable properties such as high melting points and/or strongly smectogenic-behavior than similar materials with lower birefringence:

| No. | Chemical structure | Δn | Mesophases (° C.) |
|---|---|---|---|
| 1 |  | 0.10 | K 52 S 68 N 156 I |
| 2 |  | 0.14 | K 43 S 128 N 147 I |
| 3 | 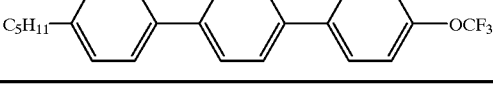 | 0.22 | K 211 S 239 I |

Mixtures of the state of the art with a birefringence suited for operation in the second or a higher transmission minimum of the Gooch-Tarry curve are not acceptable for active matrix application.

There is thus still a great need for liquid-crystal composition having a high resistivity and other suitable material properties for use in AMDs.

The invention has for one of its objectives to provide a nematic liquid crystal mixture having a positive dielectric anisotropy Δε of at least +4 and a birefringence Δn of at least 0.12, characterized in that the mixtures comprises one or more components having the core structure

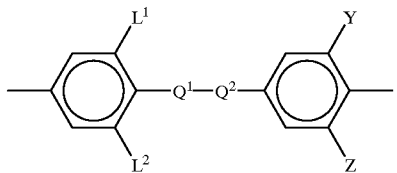

wherein $L^1$, $L^2$, Y and Z are each independently of one another H or F, one of $Q^1$ and $Q^2$ is 1,4-phenylene, 3-fluoro-1,4-phenylene or 3,5-difluoro-1,4-phenylene and the other residue $Q^1$ or $Q^2$ is —CH$_2$CH$_2$—, —CH$_2$CH$_2$CH$_2$CH$_2$— or — if at least one of $L^1$, $L^2$, Y and Z denotes F—also a single bond, whereby this core structure can be optionally further fluorinated in the benzene rings.

The invention has also for its objective to provide an matrix liquid crystal display with high temperature and UV-stability containing two plane parallel support plates which together with a frame form a cell of the thickness d,
integrated non-linear elements for switching individual picture elements on the support plates, and
a nematic liquid crystal mixture which is present in the cell, has a positive dielectric anisotropy and a birefringence Δn, the display being operated in the second or a higher transmission minimum of the Gooch-Tarry curve by appropriate selection of d. Δn, characterized in that the quotient of the voltage holding ratio HR$_{20}$ after 20 hours exposure to UV-light (280–400 nm, 12 mW/cm$^2$) and HR$_o$ before exposure to UV-light is larger or equal to 98% and also liquid crystal compositions with a very high resistivity which meet also the other demands.

It has now been found that such values for the HR are even possible for mixtures with higher birefringence by using laterally fluorinated and/or ethyl-linked non-cyano materials. Very high RC time values can be obtained in AMDs. These mixtures also show a reduced viscosity and allow short switching times at reasonable threshold voltages.

The thickness of the AMDs is preferably in the range of 3 to 10 μm. Especially preferred is the range from 3 to 7 μm.

The following preferred embodiment concern the nematic liquid crystal mixture which is present in the AMD:

The birefrigence Δn of the nematic liquid crystal mixture is 0.12 to 0.20, preferred 0.13 to 0.18.

The dielectric anisotropy of the nematic liquid crystal mixture is at least +4,0.

The liquid crystal mixture contains one or more compounds of the formula I

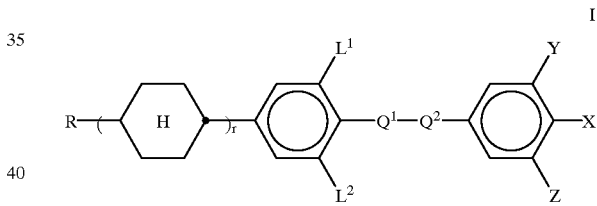

wherein
R is alkyl or alkoxy of up to 10 carbon atoms
r is 0 or 1,
X is F, Cl or a fluorinated and/or chlorinated alkyl, alkenyl or alkoxy group of 1, 2 or more carbon atoms, and
$L^1$, $L^2$, $Q_1$, $Q^2$ Y and Z have the meaning given above.

The liquid crystal mixture contains one or more compounds of the formula II

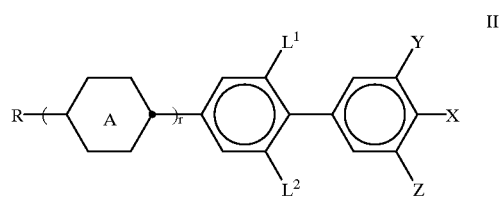

wherein
R is alkyl or alkoxy of up to 10 carbon atoms
r is 0 or 1,
X is F, Cl or a fluorinated and/or chlorinated alkyl, alkenyl or alkoxy group of 1, 2 or more carbon atoms, and
A is trans-1,4-cyclohexylene or 1,4-phenylene, $L^1$, $L^2$, Y and Z have the meaning given above, with the proviso that at least one of $L^1$, $L^2$, Y and Z is F.

The liquid crystal mixture contains one or more compounds of the group consisting of III to IX The highly advantageous properties of the claimed mixtures are achieved by using components having the core structure:

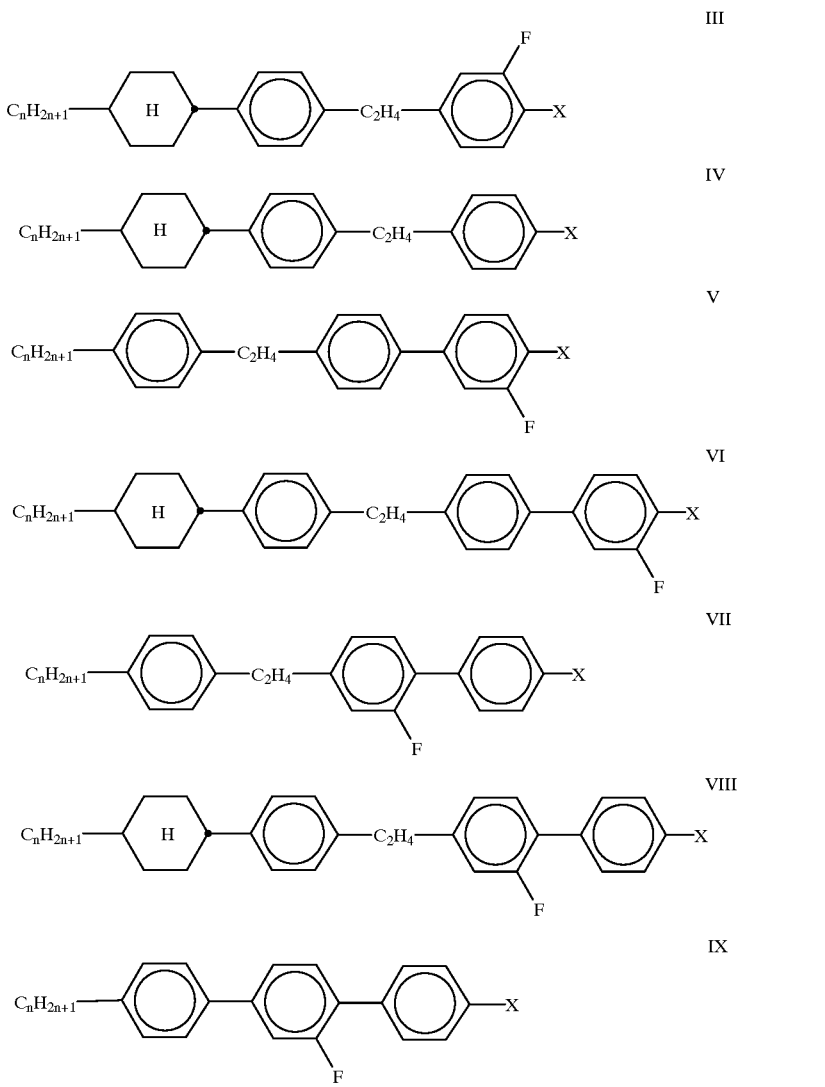

wherein n is preferably 1 to 7 and X denotes F, Cl, $CF_3$, $OCF_3$ or $OCHF_2$.

The compounds shown above are known from, e.g., DOS 30 42 391, DOS 39 02 328, DOS 39 13 554, DOS 39 09 802, WO 89/02884, WO 90/15113, WO 90/09420, the International Patent Appln. No. PCT/EP 90/01292, No. PCT/EP 91/00411, No. PCT/EP 90/01471, No. PCT/EP 90/0 2109 and the European Patent Appln. No. 9 1 100 675.7 or can be prepared in analogy to known compounds.

The mixtures according to the present invention usually are based on the medium polar components having the indicated core structure and other non-cyano components. Of course, however, such mixtures can also additionally contain known cyano LC components if extremely high values for the HR are not needed, e.g., for TN or STN-use. Such mixtures can also contain tolan components for adjusting extremely high Δn values. The resulting mixtures are important for achieving very broad nematic phase ranges including very low temperatures (outdoor use).

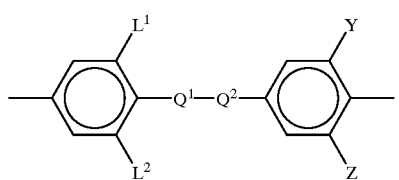

The nature of the remaining terminal groups is not very critical an therecan be used succesfully a vast multitude of non polar and medium polar halogenated terminal groups. The terminal group located at the X and Y substituted ring is a medium polar group such as F, Cl or a fluorinated and/or chlorinated alkyl, alkoxy or alkenyl group of 1, 2 or more carbon atoms. Preferred groups are F, Cl, $CF_3$, $OCF_3$, $CHF_2$, $OCHF_2$, $OCF_2Cl$, $OCF_2CF_2H$.

The other terminal group is preferably a non polar group such as

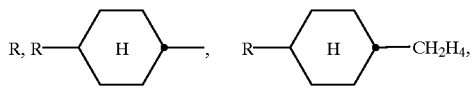

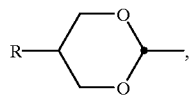

etc. R is preferably an alkyl, alkoxy, oxaalkyl, dioxaalkyl, alkenyl, fluoroalkyl or chloroalkyl group of in each case up to 10 carbon atoms.

The preparation of the mixtures according to the invention is effected in the conventional manner. In general, the desired amount of the components which is used in the smaller amount is dissolved in the components which constitutes the main constituent, preferably at elevated temperature. If this temperature is chosen to be above the clear point of the main constituent, the completeness of the process of dissolving can be observed particularly easily.

However, it is also possible to mix solutions of the components in a suitable organic solvent, for example, acetone, chloroform or methanol, and to remove the solvent without introducing any contaminants or undesirable dopants.

By means of suitable additives the liquid crystal phases according to the invention can be modified in such a way that they can be used in any hitherto disclosed kind of AMD.

Especially preferred are the mixtures of the present invention for use in active matrix projection systems including PDLC type systems.

EXAMPLES

The examples below serve to illustrate the invention without limiting it. In the examples, the melting point and clear point of a liquid crystal substance are given in degrees Celsius. The percentages are by weight.

The measurement of HR was performed as described by S. Matsumoto et al. (Liquid Crystals 5, 1320 (1989)) in standard 6 $\mu$ TN-displays without spacers. Standard floatglass with conductive ITO layers (Balzers) and a rubbed polyimide layer (AL-1051 of Japan Synthetic Rubber) as orientation layer was used. The cells were sealed with an UV-curable adhesive (NOA-61 of Norland) and filled under standard conditions. The liquid crystal mixture was composed of components being carefully purified under standard procedures. UV exposure was performed in a Heraeus-Suntest with a Xenon lamp (1.1 kw, 0.082 W/cm$^2$, UV cutoff 310 nm).

In the present patent application and in the following examples all chemical structures of LC compounds are given by acronyms the transformation of which into chemical formulae is done as shown in the following. All residues $C_nH_{2n+1}$ and $C_mH_{2m+1}$ are straight-chained alkyl groups with n or m carbon atoms, respectively. The code of Table B is self-explanatory. In Table A only the acronym for the core structure is given. In a concrete compound this acronym is followed by a dash and a code for the substituents R$^1$, R$^2$, L$^1$ and L$^2$ as follows:

| Code for R$^1$, R$^2$, L$^1$, L$^2$ | R$^1$ | R$^2$ | L$^1$ | L$^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nOmFF | $C_nH_{2n+1}$ | $OC_mH_{2m+1}$ | F | F |
| nmF | $C_nH_{2n+1}$ | $C_mH_{2m+1}$ | F | H |
| nCF$_3$ | $C_nH_{2n+1}$ | CF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nNF | $C_nH_{2n+1}$ | CN | F | H |
| nAm | $C_nH_{2n+1}$ | COOC$_m$H$_{2m+1}$ | H | H |

TABLE A

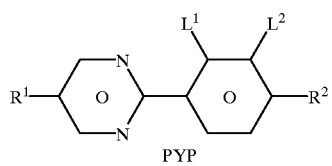

PYP

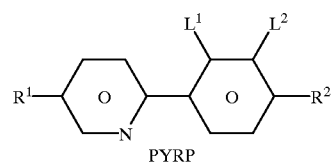

PYRP

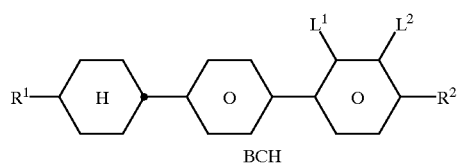

BCH

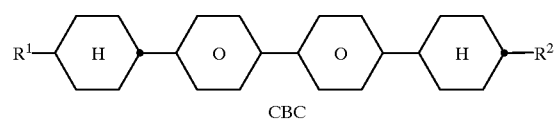

CBC

TABLE A-continued
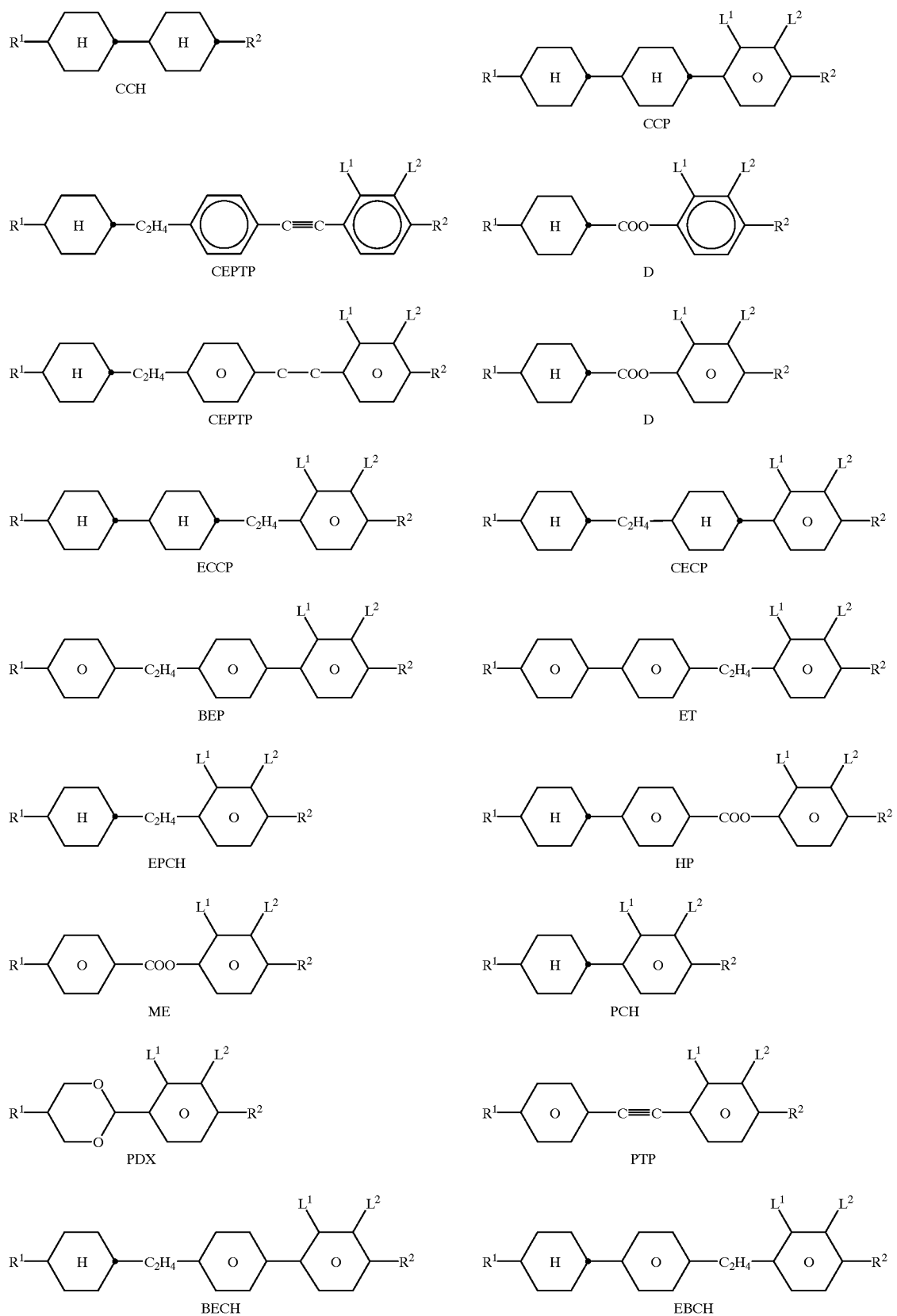

TABLE A-continued
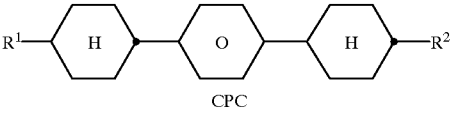 CPC
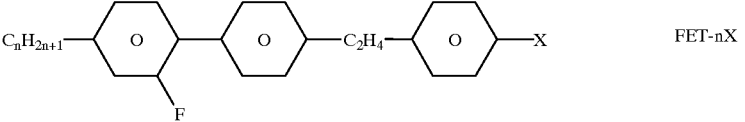 FET-nX
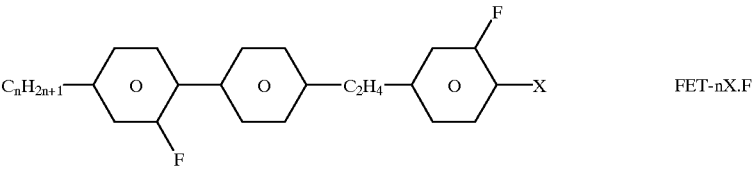 FET-nX.F
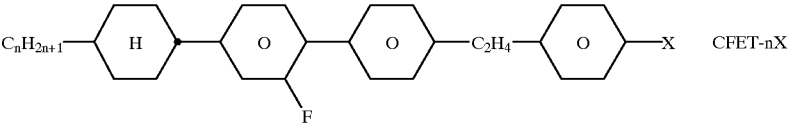 CFET-nX
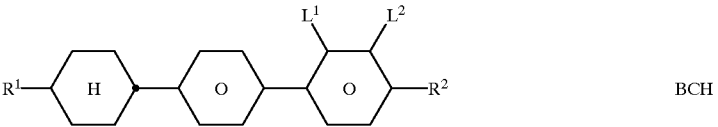 BCH
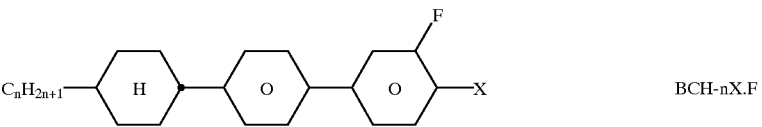 BCH-nX.F
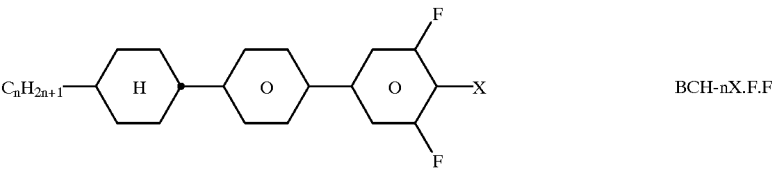 BCH-nX.F.F
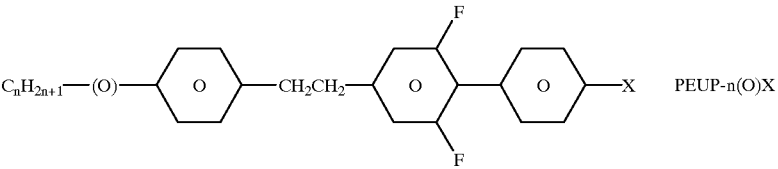 PEUP-n(O)X
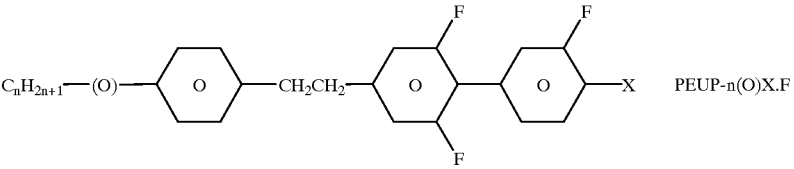 PEUP-n(O)X.F TABLE A-continued
| Structure | Name |
|---|---|
| 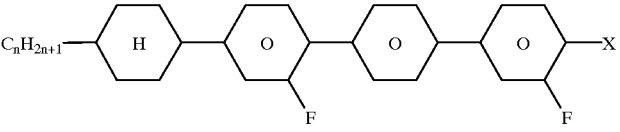 | CLPP-nX.F |
| 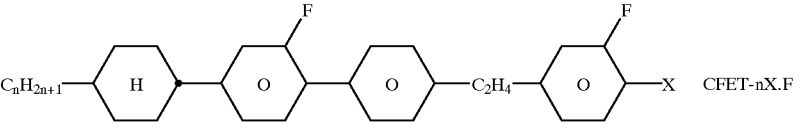 | CFET-nX.F |
| 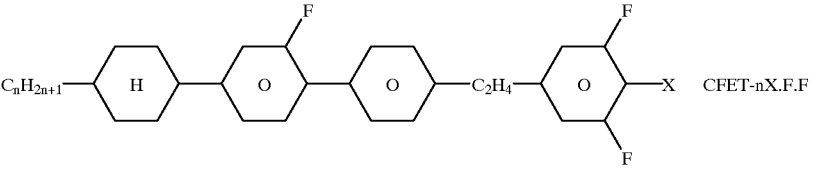 | CFET-nX.F.F |
| 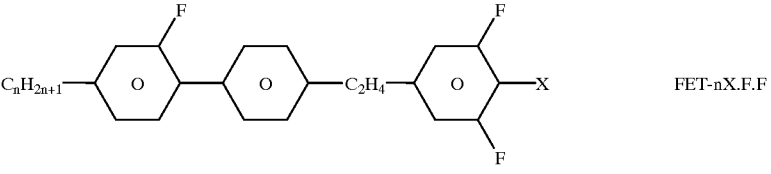 | FET-nX.F.F |
TABLE B
| Structure | Name | Structure | Name |
|---|---|---|---|
| 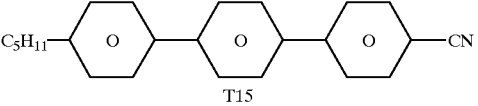 | T15 | 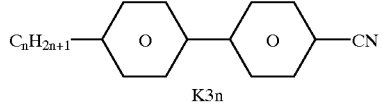 | K3n |
| 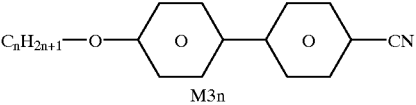 | M3n | 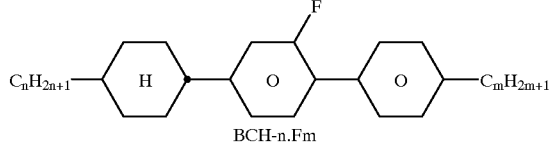 | BCH-n.Fm |
| 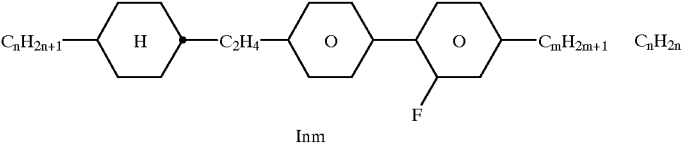 | Inm | 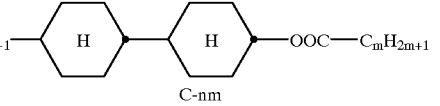 | C-nm |
| 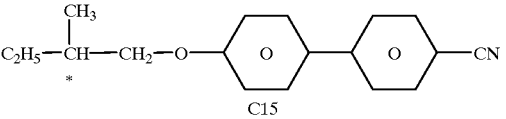 | C15 | 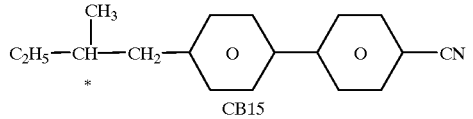 | CB15 |
| 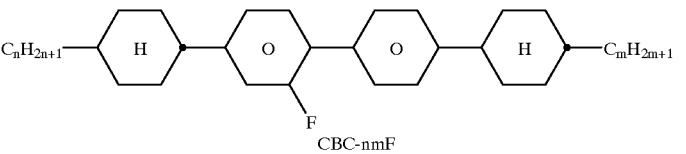 | CBC-nmF | | |

TABLE B-continued
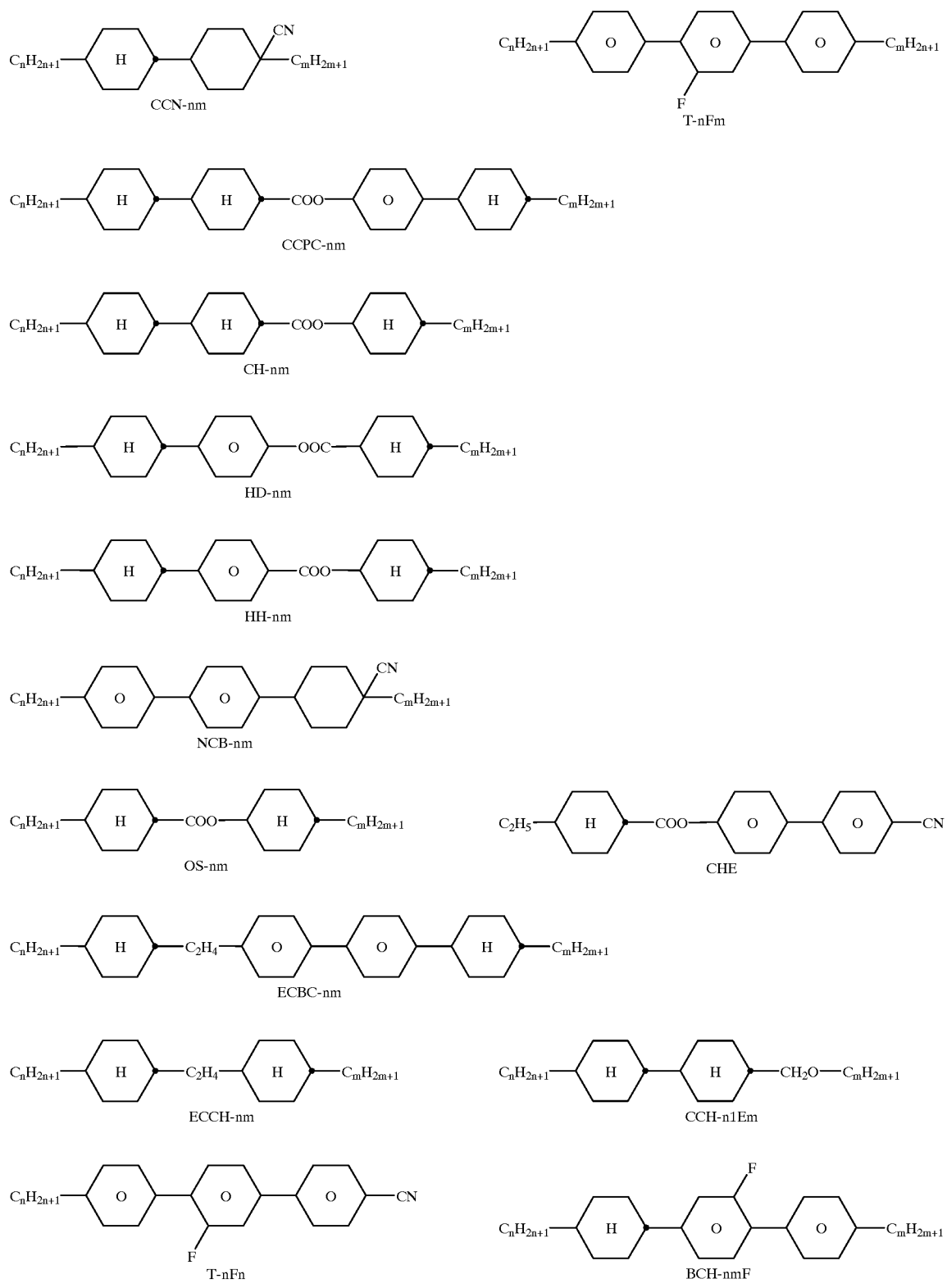

| Example 1 | | Example 2 | | Example 3 | |
|---|---|---|---|---|---|
| CFET-5F | 20% | CFET-5F | 17% | CFET-5F | 17% |
| CFET-5Cl | 10% | CFET-5Cl | 8.5% | CFET-5Cl | 8.5% |
| FET-5F | 30% | FET-5F | 25.5% | FET-5F | 25.5% |
| FET-5Cl | 30% | FET-5Cl | 25.5% | FET-5Cl | 25.5% |
| EBCH-3F | 10% | EBCH-3F | 8.5% | EBCH-3F | 8.5% |
| | | FET-3F | 15% | EBCH-5F | 8.5% |
| | | | | EBCH-3Cl | 8.5% |

| Example 4 | | Example 5 | | Example 6 | |
|---|---|---|---|---|---|
| CFET-5F | 17% | CFET-5F | 10% | CFET-5F | 10% |
| CFET-5Cl | 8.5% | CFET-5Cl | 10% | CFET-5Cl | 10% |
| FET-5F | 25.5% | FET-5F | 25% | FET-5F | 20% |
| FET-5Cl | 25.5% | FET-5Cl | 15% | FET-5Cl | 10% |
| EBCH-3F | 8.5% | PCH-5Cl | 20% | PCH-5Cl | 10% |
| PCH-5Cl | 7.8% | PCH-5Cl | 20% | PCH-7Cl | 10% |
| PCH-7Cl | 7.2% | | | T-3F2 | 15% |
| | | | | T-2F3 | 15% |

| Example 7 | | Example 8 | | Example 9 | |
|---|---|---|---|---|---|
| CFET-5F | 16.9% | CFET-5F | 17% | CFET-5F | 12.5% |
| CFET-5Cl | 8.5% | CFET-5Cl | 8.5% | CFET-5Cl | 6.2% |
| FET-5F | 25.3% | FET-5F | 25.5% | FET-5F | 18.6% |
| FET-5Cl | 25.3% | FET-5Cl | 25.5% | FET-5Cl | 18.6% |
| EBCH-3F | 8.5% | EBCH-3F | 8.5% | EBCH-3F | 6.2% |
| ECCP-3Cl | 15.5% | PCH-5F | 7.6% | T-2F3 | 4.7% |
| | | PCH-6F | 7.4% | T-3F2 | 4.7% |
| | | | | EBCH-5F | 9.5% |
| | | | | PCH-5Cl | 9.5% |
| | | | | FET-3F | 9.5% |

| Example | Melting point/ S—N (° C.) | Clearing point (° C.) | Δn | Δε |
|---|---|---|---|---|
| 1 | −13 | 104 | 0.189 | |
| 2 | −10 | 95 | 0.187 | |
| 3 | −24 | 98 | 0.176 | 5.0 |
| 4 | <−40 | 87 | 0.171 | |
| 5 | <−40 | 63 | 0.145 | |
| 6 | <−40 | 75 | 0.142 | |
| 7 | −25 | 112 | 0.178 | |
| 8 | <−40 | 80 | 0.172 | |

All mixtures shown above show $HR_{20}/HR_0 \geq 98\%$ and are thus highly valuable as high Δn mixtures for AMDs.

Example 10

| BCH-3F.F | 18% | S → N < −40° |
| BCH-5F.F | 18% | N → I 97° |
| BCH-5CF$_3$ | 4.3% | Δn 0.129 |
| EBCH-3F | 14.5% | Δε 6.1 |
| EBCH-5F | 15.5% | η$_{20}$ 23 mm$^2$s$^{-1}$ |
| ECCP-3F.F | 14.7% | HR and 20 hours |
| ECCP-5CF$_3$ | 7.5% | Suntest: 98.9% |
| BEP-20F | 2.5% | |
| ET-5F | 5.0% | |

Example 11

| CFET-3F | 20.0% | S → N [° C.] | <−40 |
| CFET-5F | 10.0% | Clearing point | +94 |
| FET-3F | 30.0% | Viscosity [mm$^2$s$^{-1}$] 20° C. | 35 |
| FET-5F | 30.0% | Δn (589 nm, 20° C.) | +0.1814 |
| EBCH-3F | 10.0% | Δε (1 kHz, 20° C.) | +5.41 |
| | | $V_{(10,0,20)}$ [V] | 3.04 |

Example 12

| PCH-5F | 8.0% | S → N [° C.] | <−40 |
| PCH-6F | 8.0% | Clearing point [° C.] | +93 |
| PCH-7F | 8.0% | Viscosity [mm$^2$s$^{-1}$] | 22 |
| FET-3F | 6.0% | Δn (589 nm, 20° C.) | +0.1305 |
| FET-5F | 4.0% | Δε (1 kHz, 20° C.) | +4.59 |
| CFET-3F | 8.0% | $V_{(10,0,20)}$ [V] | 2.67 |
| CFET-5F | 9.0% | | |
| BCH-3F.F | 14.0% | | |
| BCH-5F.F | 13.0% | | |
| BCH-52F | 8.0% | | |
| CBC-33F | 2.0% | | |
| CBC-53F | 3.0% | | |
| CBC-55F | 2.0% | | |
| ECCP-30CF$_3$ | 7.0% | | |

Example 13

| PCH-5F | 8.0% | S → N [° C.] | <−40 |
| PCH-6F | 8.0% | Clearing point [° C.] | +91 |
| PCH-7F | 8.0% | Viscosity [mm$^2$s$^{-1}$] | 22 |
| FET-3F | 6.0% | Δn (589 nm, 20° C.) | +0.1296 |
| FET-5F | 4.0% | Δε (1 kHz, 20° C.) | +4.83 |
| CFET-3F.F | 8.0% | $V_{(10,0,20)}$ [V] | 2.58 |
| CFET-5F | 9.0% | | |
| BCH-3F.F | 14.0% | | |
| BCH-5F.F | 13.0% | | |
| BCH-52F | 8.0% | | |
| CBC-33F | 2.0% | | |
| CBC-53F | 3.0% | | |
| CBC-55F | 2.0% | | |
| ECCP-30CF$_3$ | 7.0% | | |

Example 14

| PCH-5F | 8.0% | Clearing point [° C.] | +77 |
| PCH-6F | 8.0% | Δn (589 nm, 20° C.) | +0.1225 |
| PCH-7F | 8.0% | $V_{(10,0,20)}$ [V] | 2.21 |
| FET-3F | 6.0% | | |
| FET-5F | 4.0% | | |
| CFET-3F.F | 8.0% | | |
| CFET-5F | 9.0% | | |
| BCH-3F.F.F | 14.0% | | |
| BCH-5F.F.F | 13.0% | | |
| BCH-52F | 8.0% | | |
| CBC-33F | 2.0% | | |
| CBC-53F | 3.0% | | |
| CBC-55F | 2.0% | | |
| ECCP-30CF$_3$ | 7.0% | | |

Example 15

| PCH-5F | 7.6% | Clearing point [° C.] | +82 |
| FCH-6F | 7.6% | Δn (589 nm, 20° C.) | +0.1210 |
| PCH-7F | 7.6% | $V_{(10,0,20)}$ [V] | 2.25 |
| FET-3F | 5.7% | | |

-continued

| | |
|---|---|
| FET-5F | 3.8% |
| CFET-3F.F | 7.6% |
| CFET-5F | 8.5% |
| BCH-3F.F.F | 13.3% |
| BCH-5F.F.F | 12.3% |
| BCH-52F | 7.6% |
| CBC-33F | 1.9% |
| CBC-53F | 2.9% |
| CBC-55F | 1.9% |
| ECCP-30CF$_3$ | 6.7% |
| CP-4F | 5.0% |

Example 16

| | | | |
|---|---|---|---|
| PCH-5F | 7.6% | Clearing point [° C.] | +87 |
| PCH-6F | 7.6% | Δn (589 nm, 20° C.) | +0.1260 |
| PCH-7F | 7.6% | V$_{(10,0,20)}$ [V] | 2.33 |
| FET-3F | 5.7% | | |
| FET-5F | 3.8% | | |
| CFET-3F.F | 7.6% | | |
| CFET-5F | 8.5% | | |
| BCH-3F.F.F | 13.3% | | |
| BCH-5F.F.F | 12.3% | | |
| BCH-52F | 7.6% | | |
| CBC-33F | 3.9% | | |
| CBC-53F | 3.9% | | |
| CBC-55F | 3.9% | | |
| ECCP-30CF$_3$ | 6.7% | | |

Example 17

| | | | |
|---|---|---|---|
| PCH-5F | 5.0% | Clearing point [° C.] | +86 |
| PCH-6F | 8.0% | Δn (589 nm, 20° C.) | +0.1379 |
| PCH-7F | 4.0% | V$_{(10,0,20)}$ [V] | 2.19 |
| FET-3F | 8.0% | | |
| FET-5F | 7.0% | | |
| CFET-3F.F | 10.0% | | |
| CFET-5F | 9.0% | | |
| BCH-3F.F | 12.0% | | |
| BCH-5F.F | 12.0% | | |
| BCH-3F.F.F | 6.0% | | |
| BCH-5F.F.F | 12.0% | | |
| CBC-33F | 2.0% | | |
| CBC-53F | 3.0% | | |
| CBC-55F | 2.0% | | |

Example 18

| | | | |
|---|---|---|---|
| PCH-5F | 8.0% | Clearing point [° C.] | +91 |
| PCH-6F | 8.0% | Viscosity [mm$^2$s$^{-1}$] 20° C. | 23 |
| PCH-7F | 7.0% | Δn (589 nm, 20° C.) | +0.1449 |
| FET-3F | 6.0% | V$_{(10,0,20)}$ [V] | 2.66 |
| FET-5F | 4.0% | | |
| CFET-3F.F | 8.0% | | |
| CFET-5F | 9.0% | | |
| BCH-3F.F | 14.0% | | |
| BCH-5F.F | 13.0% | | |
| PTP-102 | 4.0% | | |
| PTP-201 | 4.0% | | |
| CBC-33F | 3.0% | | |
| CBC-53F | 3.0% | | |
| CBC-55F | 2.0% | | |
| ECCP-30CF$_3$ | 7.0% | | |

Example 19

| | | | |
|---|---|---|---|
| PCH-5F | 5.0% | Clearing point [° C.] | +86 |
| PCH-6F | 8.0% | Δn (589 nm, 20° C.) | +0.1370 |
| PCH-7F | 4.0% | V$_{(10,0,20)}$ [V] | 2.05 |
| FET-3F | 8.0% | | |
| FET-5F | 7.0% | | |
| CFET-3F.F | 10.0% | | |
| CFET-5F.F | 9.0% | | |
| BCH-3F.F | 12.0% | | |
| BCH-5F.F | 12.0% | | |
| BCH-3F.F.F | 6.0% | | |
| BCH-5F.F.F | 12.0% | | |
| CBC-33F | 2.0% | | |
| CBC-53F | 3.0% | | |
| CBC-55F | 2.0% | | |

Example 20

| | | | |
|---|---|---|---|
| PCH-5F | 5.0% | Clearing point [° C.] | +85 |
| PCH-6F | 8.0% | Viscosity [mm$^2$s$^{-1}$] 20° C. | 30 |
| PCH-7F | 4.0% | Δn (589 nm, 20° C.) | +0.1360 |
| FET-3F | 7.0% | V$_{(10,0,20)}$ [V] | 2.00 |
| FET-5F | 7.0% | | |
| CFFT-3F.F | 10.0% | | |
| CFET-5F.F | 10.0% | | |
| BCH-3F.F | 10.0% | | |
| BCH-5F.F | 10.0% | | |
| BCH-3F.F.F | 12.0% | | |
| BCH-5F.F.F | 10.0% | | |
| CBC-33F | 2.0% | | |
| CBC-53F | 3.0% | | |
| CBC-55F | 2.0% | | |

Example 21

| | | | |
|---|---|---|---|
| PCH-5F | 6.0% | Clearing point [° C.] | +93 |
| PCH-6F | 9.0% | Viscosity [mm$^2$s$^{-1}$] 20° C. | 32 |
| FET-3F | 7.0% | Δn (589 nm, 20° C.) | +0.1395 |
| FET-5F | 7.0% | V$_{(10,0,20)}$ [V] | 2.13 |
| CFET-3F.F | 10.0% | | |
| CFET-5F.F | 10.0% | | |
| BCH-3F.F | 10.0% | | |
| BCH-5F.F | 10.0% | | |
| BCH-3F.F.F | 12.0% | | |
| BCH-5F.F.F | 10.0% | | |
| CBC-33F | 3.0% | | |
| CBC-53F | 3.0% | | |
| CBC-55E | 3.0% | | |

Example 22

| | | | |
|---|---|---|---|
| PCH-5F | 8.0% | S → N [° C.] | <−30 |
| PCH-6F | 8.0% | Clearing point [° C.] | +89 |
| FCH-7F | 8.0% | Viscosity [mm$^2$s$^{-1}$] | 25 |
| FET-3F | 6.0% | Δn (589 nm, 20° C.) | +0.1273 |
| FET-5F | 4.0% | V$_{(10,0,20)}$ [V] | 2.53 |
| CFET-3F.F | 8.0% | | |
| CFET-5F.F | 9.0% | | |
| BCH-3F.F | 14.0% | | |
| BCH-5F.F | 13.0% | | |
| BCH-52F | 8.0% | | |
| CBC-33F | 2.0% | | |
| CBC-53F | 3.0% | | |
| CBC-55F | 2.0% | | |
| ECCP-30CF$_3$ | 7.0% | | |

Example 23

| | | | |
|---|---|---|---|
| PCH-5F | 9.0% | Clearing point [° C.] | +90 |
| PCH-6F | 9.0% | Δn (20° C., 589 nm) | +0.1383 |
| FET-5CL | 15.0% | $V_{(10,0,20)}$ | 2.56 |
| FET-3CL | 15.0% | | |
| BCH-3F.F | 12.0% | | |
| BCH-5F.F | 12.0% | | |
| CCP-30CF$_3$ | 5.0% | | |
| CCP-50CF$_3$ | 5.0% | | |
| ECCP-3F.F | 4.0% | | |
| ECCP-5F.F | 3.0% | | |
| CBC-33F | 4.0% | | |
| CBC-53F | 4.0% | | |
| CBC-55F | 3.0% | | |

Example 24

| | | | |
|---|---|---|---|
| PCH-5F | 9.0% | Clearing point [° C.] | +94 |
| PCH-6F | 9.0% | Δn (20° C., 589 nm) | +0.1231 |
| FET-5CL | 15.0% | $V_{(10,0,20)}$ | 2.82 |
| FET-3CL | 15.0% | | |
| CCP-20CF$_3$ | 5.0% | | |
| CCP-30CF$_3$ | 5.0% | | |
| CCP-40CF$_3$ | 5.0% | | |
| CCP-50CF$_3$ | 5.0% | | |
| ECCP-3F.F | 10.0% | | |
| ECCP-5F.F | 10.0% | | |
| CBC-33F | 4.0% | | |
| CBC-53F | 4.0% | | |
| CBC-55F | 4.0% | | |

Example 25

| | | | |
|---|---|---|---|
| B-30CF3 | 8.0% | Clearing point [° C.] | 65.9 |
| B-50CF3 | 10.0% | Δn (589 nm, 20° C.) | 0.1215 |
| B-70CF3 | 10.0% | | |
| CCP-20CF$_3$ | 8.0% | | |
| CCP-30CF$_3$ | 10.0% | | |
| CCP-40CF$_3$ | 5.0% | | |
| CCP-50CF$_3$ | 12.0% | | |
| BCH-3F.F | 14.0% | | |
| BCH-5F.F | 14.0% | | |
| PEUP-20F.F | 3.0% | | |
| PEUP-200CF3 | 3.0% | | |
| PEUP-20F | 3.0% | | |

Example 26

| | | | |
|---|---|---|---|
| CLPP-5F.F | 5.0% | S → N [° C.] | <0 |
| BEP5F.F | 10.0% | Clearing point [° C.] | +97 |
| FET-3F | 8.0% | Δn (589 nm, 20° C.) | 0.1660 |
| FET-5F | 11.0% | Δε (1 kHz, 20° C.) | 7.6 |
| CFET-3F.F | 7.0% | | |
| CFET-5F.F | 7.0% | | |
| CFET-3F | 2.0% | | |
| CFET-5F | 6.0% | | |
| BCH-2F.F | 10.0% | | |
| BCH-3F.F | 10.0% | | |
| BCH-5F.F | 10.0% | | |
| BCH-3F.F.F | 7.0% | | |
| BCH-5F.F.F | 7.0% | | |

Example 27

| | | | |
|---|---|---|---|
| CFET-3F.F | 20.0% | Clearing point [° C.] | +99 |
| CFET-5F.F | 20.0% | Δn (589 nm, 20° C.) | +0.1855 |
| FET-3F | 30.0% | $V_{(10,0,20)}$ [V] | 2.71 |
| FET-5F | 30.0% | | |

Example 28

| | | | |
|---|---|---|---|
| BCH-3F.F.F | 30.0% | Clearing point [° C.] | +79 |
| BCH-5F.F.F | 50.0% | Viscosity [mm$^2$s$^{-1}$] | 41 |
| CFET-3F.F | 10.0% | Δn (589 nm, 20° C.) | +0.1375 |
| CFET-5F.F | 10.0% | $V_{(10,0,20)}$ [V] | 1.49 |

Example 29

| | | | |
|---|---|---|---|
| PCH-5F | 8.0% | S → N [° C.] | <−30 |
| PCH-6F | 8.0% | Clearing point [° C.] | +89 |
| PCH-7F | 8.0% | Viscosity [mm$^2$s$^{-1}$] | 25 |
| FET-3F | 6.0% | Δn (589 nm, 20° C.) | +0.1273 |
| FET-5F | 4.0% | Δε (1 kHz, 20° C.) | +5.0 |
| CFET-3F.F | 8.0% | $V_{(10,0,20)}$ [V] | 2.53 |
| CFET-5F.F | 9.0% | | |
| BCH-3F.F | 14.0% | | |
| BCH-5F.F | 13.0% | | |
| BCH-52F | 8.0% | | |
| CBC-33F | 2.0% | | |
| CBC-53F | 3.0% | | |
| CBC-55F | 2.0% | | |
| ECCP-30CF$_3$ | 7.0% | | |

Example 30

| | | | |
|---|---|---|---|
| PCH-5F | 5.0% | Clearing point [° C.] | +84 |
| PCH-6F | 8.0% | Δn (589 nm, 20° C.) | +0.1354 |
| PCH-7F | 4.0% | $V_{(10,0,20)}$ [V] | 1.99 |
| FET-3F | 7.0% | | |
| FET-5F.F | 7.0% | | |
| CFET-3F.F | 10.0% | | |
| CFET-5F.F | 10.0% | | |
| BCH-3F.F | 10.0% | | |
| BCH-5F.F | 10.0% | | |
| BCH-3F.F.F | 12.0% | | |
| BCH-5F.F.F | 10.0% | | |
| CBC-33F | 2.0% | | |
| CBC-53F | 3.0% | | |
| CBC-55F | 2.0% | | |

Example 31

| | | | |
|---|---|---|---|
| FET-3F.F | 7.0% | Clearing point [° C.] | +82 |
| FET-5F.F | 7.0% | Δn (589 nm, 20° C.) | +0.130 |
| CFET-3F.F.F | 10.0% | $V_{(10,0,20)}$ [V] | 1.76 |
| CFET-5F.F.F | 10.0% | | |
| PCH-5F | 5.0% | | |
| PCH-6F | 8.0% | | |
| PCH-7F | 4.0% | | |
| BCH-3F.F | 10.0% | | |
| BCH-5F.F | 10.0% | | |
| BCH-3F.F.F | 12.0% | | |
| BCH-5F.F.F | 10.0% | | |
| CBC-33F | 2.0% | | |
| CBC-53F | 3.0% | | |
| CBC-55F | 2.0% | | |

Example 32

| | | | |
|---|---|---|---|
| PCH-5F | 5.0% | Clearing point [° C.] | +81 |
| PCH-7F | 5.0% | Δn (589 nm, 20° C.) | +0.142 |
| FET-3F.F | 7.0% | $V_{(10,0,20)}$ [V] | 1.68 |
| FET-5F.F | 7.0% | | |
| CFET-3F.F | 12.0% | | |
| CFET-5F.F | 10.0% | | |
| CFET-3F.F.F | 12.0% | | |
| CFET-5F.F.F | 10.0% | | |
| BCH-3F.F.F | 12.0% | | |
| BCH-5F.F.F | 11.0% | | |
| CBC-33F | 3.0% | | |
| CBC-53F | 3.0% | | |
| CBC-55F | 3.0% | | |

We claim:

1. A nematic liquid crystal mixture having a positive dielectric anisotropy Δε of at least +4 and a birefringence Δε of at least 0.13, wherein the mixture comprises one or more components of the formula I:

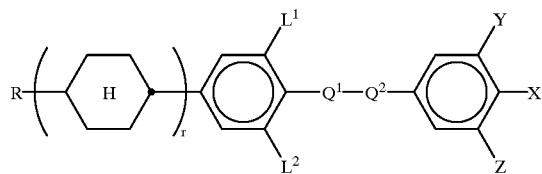

wherein $L^1$ is F, $L^2$, Y and Z are each independently of one another H or F, one of $Q^1$ and $Q^2$ is 1,4-phenylene, 3-fluoro-1,4-phenylene or 3,5-difluoro-1,4-phenylene and the other of $Q^1$ or $Q^2$ is —CH$_2$CH$_2$—, —CH$_2$CH$_2$CH$_2$CH$_2$— or a single bond, R is alkyl, alkoxy, oxaalkyl, dioxaalkyl, alkenyl, fluoroalkyl or chloroalkyl of 1–10 carbon atoms, r is 0 or 1 and X is F, Cl or a fluorinated and/or chlorinated alkyl, alkenyl or alkoxy group of 1 or 2 carbon atoms.

2. Mixture according to claim 1 being essentially free of cyano components.

3. The mixture of claim 1, wherein in formula (I) one of $Q^1$ or $Q^2$ is —CH$_2$CH$_2$—.

4. The mixture of claim 1, further containing one or more compounds of the formula II

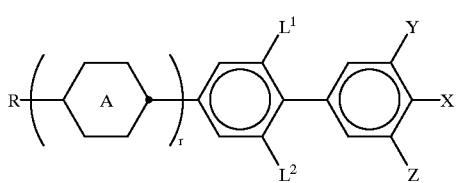

wherein

R is alkyl, alkoxy or alkenyl of up to 10 carbon atoms,
A is trans-1,4-cyclohexylene or 1,4-phenylene,
r is 1,
X is F, Cl, CF$_3$, OCF$_3$ or OCHF$_2$, and
$L^1$, $L^2$ Y and Z are independently H or F with the proviso that at least one of $L^1$, $L^2$, Y and Z is F.

5. The mixture of claim 1, further containing one or more compounds selected from the group consisting of compounds of the formulae III to IX:

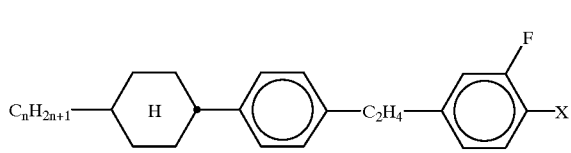

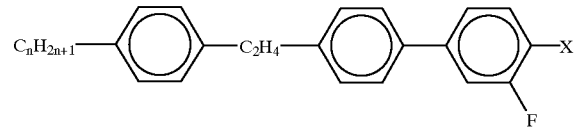

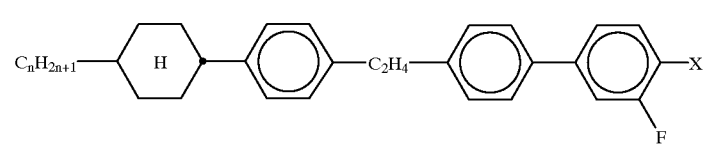

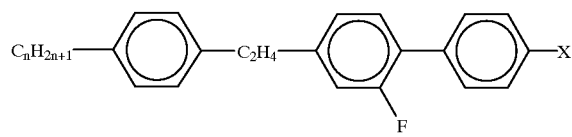

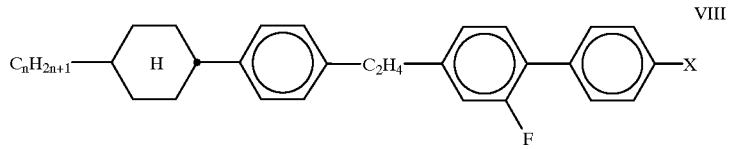

VIII

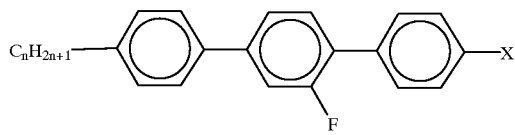

IX wherein n is 1 to 7 and X is F, Cl, $CF_3$, $OCF_3$ or $OCHF_2$.

6. The mixture of claim 1, wherein in the formula (I), X is F, Cl, $CF_3$, $OCF_3$ or $OCHF_2$.

7. The mixture of claim 1, wherein in the formula (I), R is alkyl or alkoxy of 1–10 carbon atoms.

8. The mixture of claim 1, further containing one or more compounds of the following formula

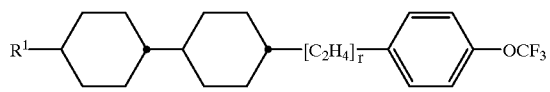

wherein r is 0 or 1 and $R^1$ is alkyl or alkoxy with 1 to 10 carbon atoms.

9. The mixture of claim 1, wherein in the component of formula I, $L^2$ is H.

10. The mixture of claim 1, wherein in the formula (I), one of $Q^1$ or $Q^2$ is a single bond.

11. Matrix liquid crystal display with high temperature and UV-stability containing
 two plane parallel support plates which together with a frame form a cell of thickness d,
 integrated non-linear elements for switching individual picture elements on the support plates, and
 a nematic liquid crystal mixture which is present in the cell, has a positive dielectric anisotropy and a birefringence Δn of at least 0.13, the mixture comprising one or more components of the formula I:

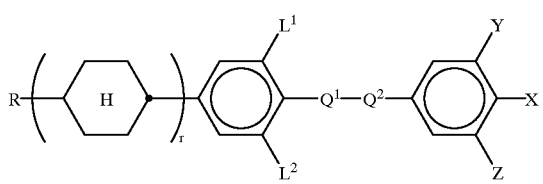

(I)

wherein $L^1$ is F, $L^2$, Y and Z are each independently of one another H or F, one of $Q^1$ and $Q^2$ is 1,4-phenylene, 3-fluoro-1,4-phenylene or 3,5-difluoro-1,4-phenylene and the other of $Q^1$ or $Q^2$ is —$CH_2CH_2$—, —$CH_2CH_2CH_2CH_2$— or a single bond, R is alkyl, alkoxy, oxaalkyl, dioxaalkyl, alkenyl, fluoroalkyl or chloroalkyl of 1–10 carbon atoms, r is 0 or 1 and X is F, Cl or a fluorinated and/or chlorinated alkyl, alkenyl or alkoxy group of 1 or 2 carbon atoms, the display being operated in the second or a higher transmission minimum of the Gooch-Tarry curve dependent upon the value of d·Δn, wherein the quotient of the voltage holding ratio $HR_{20}$ after 20 hours exposure to UV-light (280–400 nm, 12 mW/cm$^2$) and $HR_0$ before exposure to UV-light is more than or equal to 98%.

12. Display according to claim 11, wherein the thickness d of the cell is 3 to 10 μm.

13. Display according to claim 11, wherein the birefringence Δn of the nematic liquid crystal mixture is from 0.13 to 0.20.

14. Display according to claim 4, wherein the liquid crystal mixture further contains one or more compounds of the formula II

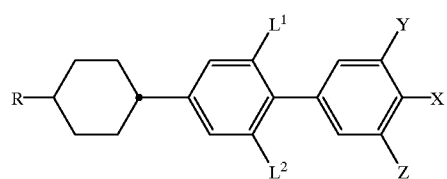

II wherein
 R is alkyl, alkoxy or alkenyl of 1 to 10 carbon atoms,
 X is F, Cl, $CF_3$, $OCF_3$ or $OCHF_2$, and
 $L^1$, $L^2$ Y and Z are each independently H or F, with the proviso that at least one of $L^1$, $L^2$ or Z is F.

15. The display according to claim 11 wherein the thickness d of the cell is 3 to 7 μm.

16. The display according to claim 11 wherein the birefringence Δn of the nematic liquid crystal mixture is from 0.13 to 0.18.

17. Display according to claim 11 wherein the liquid crystal mixture further contains one or more compounds selected from the group consisting of compounds of the formulae III to IX:

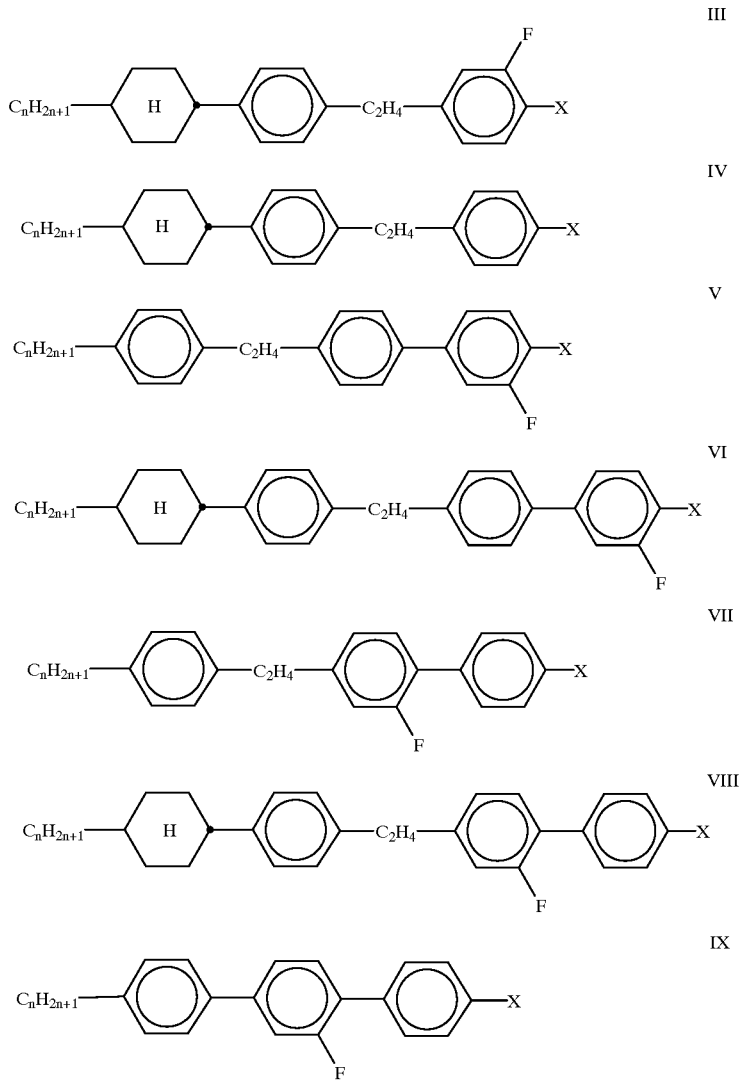

wherein n is 1 to 7 and X is F, Cl, $CF_3$, $OCF_3$ or $OCHF_2$.

18. The display of claim 11, wherein in the formula (I), X is F, Cl, $CF_3$, $OCF_3$ or $OCHF_2$.

19. The display of claim 11 wherein in the formula (I), R is alkyl or alkoxy of 1–10 carbon atoms.

20. A display according to claim 11, wherein the liquid crystal mixture further contains one or more compounds of the following formula

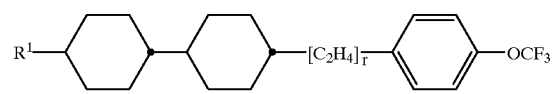

wherein r is 0 or 1 and $R^1$ is alkyl or alkoxy with 1 to 10 carbon atoms.

21. The display of claim 11, wherein in the formula (I), $L^2$ is H.

* * * * *